Figure 3:
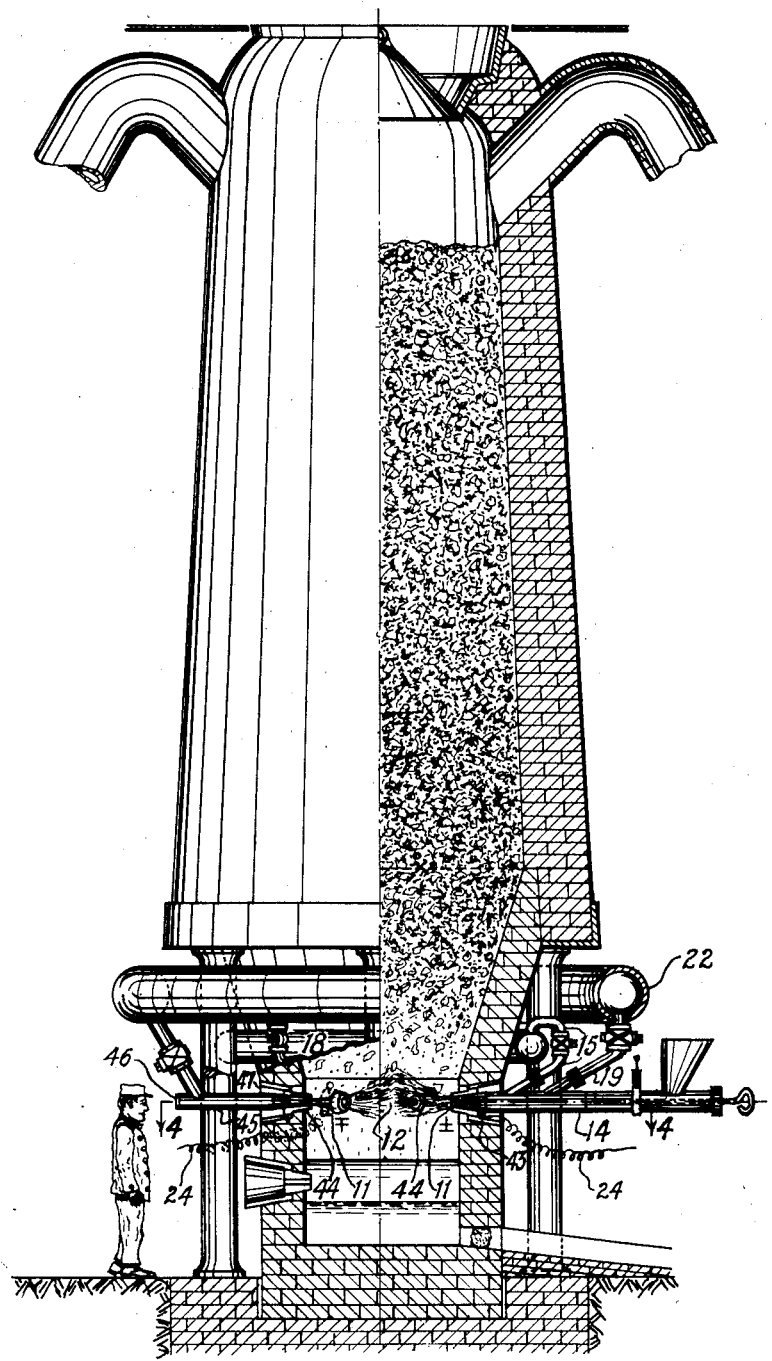

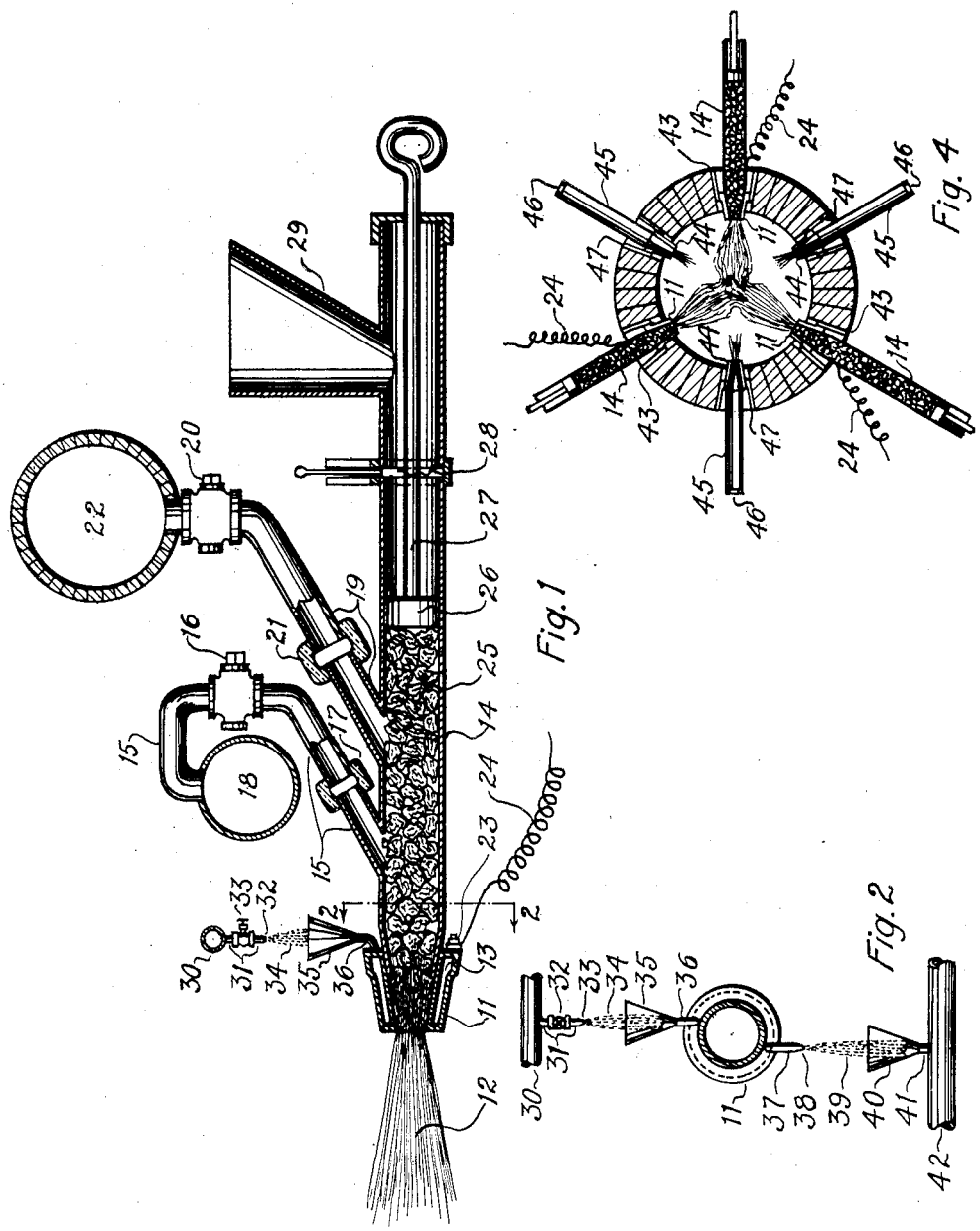

Patented Jan. 30, 1923.

1,443,439

UNITED STATES PATENT OFFICE.

GEORGE T. SOUTHGATE, OF WASHINGTON, DISTRICT OF COLUMBIA.

PROCESS AND APPARATUS FOR INTRODUCING ELECTRIC ENERGY INTO A SPACE OF ACTION.

Application filed March 8, 1922. Serial No. 541,988. REISSUED

*To all whom it may concern:*

Be it known that I, GEORGE T. SOUTHGATE, a citizen of the United States, residing at Washington, in the District of Columbia, have invented certain new and useful Improvements in Processes and Apparatus for Introducing Electric Energy into a Space of Action, of which the following is a specification.

My invention relates to a process and apparatus for introducing electric energy into a space of action where desired, and has for one of its objects to improve the efficiency of the use of electricity in smelting, industrial chemistry, melting, welding and the like, as compared with the efficiency of its use in existing processes and apparatus.

Another object of my invention is to provide a process and apparatus, for the use of electricity in furnace operations, which may be applied to existing types or even existing erected units of non-electric furnaces with but relatively little change in the construction of said furnaces except the addition thereto of my improved electric apparatus and the use therewith of my improved process.

Another object of my invention is to provide a process and apparatus, for the use of electricity in furnace operations, which may be conveniently put out of use without hindering the operation of the furnace with other sources of heat; as for example in those seasons when the use of electricity drawn from hydroelectric power plants on streams of very variable flow may be less economical than the use of fuel in the furnace.

Another object of my invention is to replace the cumbrous, expensive and rapidly consumed electrodes of ordinary electric furnaces by small, easily mounted, less expensive and less rapidly consumed electrodes.

Another object of my invention is to avoid the employment in electric furnaces of low electromotive forces and heavy currents and the consequently required massive conductors, by using the properties of my improved process and apparatus wherein the working portions of the circuits, within the furnace, have high effective resistance and consequently give high heat generation with relatively small currents.

Another object of my invention is to provide a means of performing, in an intensified degree, operations which utilize the special properties of electric arcs, such as producing waves in the ether for radio transmission of messages and of power, the detection of waves in the air or in the ether by the "response" of arc flames, and the radiation of large amounts of light and heat into space for use per se.

With these and other objects in view, my invention consists in the novel steps and combinations of steps constituting the process, and in the novel combinations of parts constituting the apparatus; all as will be more fully hereinafter disclosed and described with reference to the two accompanying drawings forming a part of this specification, and particularly pointed out in the claims.

The novel features of my invention relate to processes and apparatus which utilize the electrically conducting properties of gases heated in close proximity to conducting electrodes, and the energy-distributing properties of said gases, as means of introducing electric currents and advantageously transmitting the energy thereof wherever desired.

In my improved process and apparatus the heating of the gases for rendering them electrically conducting may be accomplished in any approved manner; but the method I prefer is to cause a portion of the heating to take place at and near the points where said gases are introduced into the space of action, by combustion thereof; and the apparatus which I prefer to use for the accomplishment of said purpose is a set of fittings combining in themselves the functions of gas nozzles and of electrodes bringing electricity of suitable high electromotive force to said gases.

In the foregoing and following explanations, wherever the word gas or gases is used in connection with the tuyères or electrodes, I refer not only to clear gases, but also to any sutiable matter in a gaseous state or in a finely divided state so that it resembles gas in the freedom of its movement, as for example smoke, dust clouds or sprays of liquid.

One of the known properties of a combustion flame is that it is capable of conducting away electricity from conductors charged at suitably high voltages, i. e., a flame can be made to act as a conductor of an electric current. Because of the high electric resistance of flame, additional heat is generated therein by such electric current, in amount proportional to the square of the current. It is also known that in any gas ambient to electric conductors, an effect can be produced by the impressing of high electromotive forces on said conductors and that this effect is apparently one of atomic disintegration or "ionization." Surrounding such conductors there may be seen under sufficiently dim illumination an artificial light, variously called "corona," "electric glow," "electrode rays" etc. At magnitudes of increasing electromotive force dependent upon the form, size, spacing, disposition, surface and other features of the conductors and upon the composition, temperature, pressure and other properties of the gas, this effect becomes very pronounced, and especially the electric conductivity of the gas increases. The dissipation of electric energy into heat in the gas is also greatly increased with increasing electromotive force.

In my invention disclosed in United States Letters Patent Numbers 1,373,639 (granted Apr. 5, 1921) and 1,369,714 (granted Feb. 22, 1921) for respectively a process and an apparatus for the fixation of gases by means of electric discharges or arcs, I have taken advantage of this gaseous conduction of electricity for the purpose of causing the atomic decomposition of the gases treated and their susceptibility to differing recomposition—also for the purpose of momentarily heating by the electric currents to such high temperatures as are conductive to their combination, gases having relatively little mutual affinity. In the invention disclosed herein any direct chemical action exerted upon the inducted gases by the ionizing effect and heat of the electric arcs is not the purpose sought, but is only incidental; said purpose actually being the use of the electric conductance of the hot gases as the means of introducing the currents of electricity for converting the electric energy into heat and other forms of energy, and, in heating apparatus, the distribution of said heat wherever desired by the flow of said gases. It is also the object of this invention to utilize in heating apparatus the heat that is generated by the previously mentioned combustion of the gases inducted through the electrodes.

In the accompanying drawings, Fig. 1 is a mid-sectional view of a combined electrode and gas nozzle constituting one form of my improved apparatus. Fig. 2 is a detail of piping forming a part of the apparatus of Fig. 1, but not convenient to show therein; being a section in the vertical plane indicated by the line 2—2. Fig. 3 represents a type of furnace in the operation of which my improved process and apparatus may be applied; the upper portion left of the central vertical axis being an elevation and the lower portion of that side and all of the right-hand side being a mid-section. Fig. 4 is a horizontal section of the furnace shown in Fig. 3, in the plane indicated by the line 4—4. Similar numbers refer to similar parts throughout the several views.

In the drawings, hollow casting 11 is a nozzle, in and through which gases are partly burned and inducted into the space-of-action 12. Casting 11 serves also as the electrode mentioned hereinbefore and hereinafter in the phrases "electrodes provided with holes", "through holes in electrodes" etc.; and wherever the words "nozzles", "electrodes" or "nozzle-electrodes" are mentioned below in the description or claims of my invention, fittings similar to casting 11 are meant. In order to prevent being melted or rapidly eroded, casting 11 preferably should be cooled by any suitable means; and I prefer to employ therefor the circulation of water in the hollow space 13 of said casting. The method and means of supplying said water is explained hereinafter. A metal blowpipe 14 is connected to nozzle 11; and the gases inducted through said nozzle are supplied by way of said blowpipe. Combustible-gas pipe 15 is connected at one end to blowpipe 14; and in said pipe 15 there are inserted valve 16 and hollow electric insulator 17, which insulates blowpipe 14 from all parts of pipe 15 except the end thereof adjacent to said blowpipe. The other end of pipe 15 is connected to any suitable source of a combustible gas under pressure, as the main 18. An oxidizing-gas pipe 19 is also connected at one end to blowpipe 14; and in said pipe 19 there are inserted valve 20 and hollow electric insulator 21, which insulates blowpipe 14 from all parts of pipe 19 except the end thereof adjacent to said blowpipe. The other end of pipe 19 is connected to any suitable source of an oxidizing gas under pressure, as the main 22. Any suitable oxidizing gas may be employed, but in the majority of cases I prefer to use air. The means of supplying combustible gas to main 18 and oxidizing gas to main 22 form no part of my present invention, and the usual practices in such cases may be followed.

Electric terminal 23 is mounted on nozzle-electrode 11; and electric connection is made as by the wire 24, from a suitable source of electromotive force.

Nozzle 11, and the portion of blowpipe 14 near said nozzle are filled with pieces 25 of electrically conducting thermally refractory material, such as carbon. Any kind of carbon may be employed, and in any suitable form adapted to be moved through the blowpipe and nozzle; but I prefer to use coke because of its cheapness, and I prefer to use coarse lumps because of the high electric conductivity, great permeability for gases and sufficient mobility of that form.

Blowpipe 14 is extended in the direction opposite from the discharge end of nozzle 11, into a cylinder in which a piston 26, driven by a piston-rod 27, is fitted. A slide valve 28 is mounted in and intersects blowpipe 11, and near the rear end of the blowpipe is provided a suitable means of feeding thereinto the aforementioned pieces of conducting material, as by the hopper 29.

For the cooling-water supply to nozzle-electrode 11 suitable provision must be made, whereby the nozzle shall not be electrically grounded or short-circuited by either the water or its conduit. I prefer to employ therefor an arrangement in which the water is delivered both to and from nozzle 11 in broken streams, and in which there is no metallic or other solid connection between nozzle 11 and either the water-supply system or the drain system. It is known that a broken stream of water, as from a hose, may with impunity be played on a conductor charged at very high voltage, and that because of the separation of the drops no appreciable electric conduction takes place in said broken stream.

Referring to Fig. 2 and also, in part to Fig. 1, from water-supply header 30 is taken supply pipe 31; which terminates in a nozzle 32 capable of breaking up the discharged water into a spray 34 of small drops. Valve 33 is used to regulate the quantity of water discharged by pipe 31. The sprayed water falls into funnel 35 and is carried to nozzle-electrode 11 by pipe 36. From nozzle 11 the spent water is similarly discharged to the drainage system via pipe 37, nozzle 38, spray 39, funnel 40, pipe 41 and drain header 42.

When my process and apparatus are applied in a smelting furnace, nozzle 11 may be mounted in a hollow ring 43, which may be water-cooled by a method and apparatus similar to that provided for nozzle 11 itself and shown by Fig. 2. Ring 43 must be insulated from other metal parts of the furnace.

In Fig. 3 and Fig. 4 are shown an application of my new process and apparatus in the operation of a furnace similar to a standard iron blast furnace; the general construction and operation of said furnace, other than the process and apparatus for introducing electric energy, not being embraced in my invention. My improved apparatus is mounted in the furnace at any suitable level, as in the plane of the regular furnace tuyères 44 and air blowpipes 45.

An advantage is gained from thus placing the nozzle-electrodes in the plane of and spaced among the tuyères, because of the resultant thorough commingling of the gases from the nozzle-electrodes with the air from the tuyères. A further advantage is gained from this arrangement in that the usual peep-hole or "eyesight" 46 in the end of each air blowpipe 45 may be used to inspect the condition, and the effect within the furnace, of not only the air blasts from said blowpipes but also of the flames from nozzle-electrodes 11. A still further advantage obtains in those cases where a furnace previously heated wholly by fuel is to be heated wholly or partly by electricity, or where a furnace already having my improved electric apparatus is to be operated for a season with the heat from fuel only, in that the usual hollow rings 47 employed in mounting the tuyères 44 may be constructed and cooled similarly to rings 43 in which electrode-nozzles 11 are supported; and that in such similar rings, tuyères and electrode-nozzles with their respective accessories, may be interchanged at will.

The operation of my new process and apparatus is as follows:—

Nozzle-electrode 11 and a portion of blowpipe 14 being filled with lumps of coke, combustible-gas valve 16 and oxidizing-gas valve 20 are partly opened and the gases allowed to flow through the nozzle-electrode. The mixed gas is then ignited by any suitable means, burning among and through the coke lumps and beyond the end of nozzle 11, and heating the said coke. At the beginning, an excess of oxidizing gas over that required for perfect union with the combustible gas may be used, in order to promote the quick heating of the coke by the partial combustion thereof. After heating the coke, however, I prefer to regulate the valves of the two gas-supply pipes in such wise that there is insufficient oxidizing gas for perfect combustion of the other gas, but a sufficient total flow of gases to cause very hot flame in the nozzle-electrode. During the further operation of the apparatus, the coke in the nozzle-electrode and in the blowpipe is gradually consumed, and the assembly thereof somewhat loosened. In order to keep this coke content reasonably compact in the nozzle and blowpipe, piston 26 should be occasionally pushed forward by hand, by means of piston-rod 27. When necessary the coke may be replenished through hopper 29, after drawing back piston 26 to the end of its travel and closing valve 28. The valve is then reopened and the new charge of coke pushed up against the old coke by means of the piston. During these operations on the apparatus either the electromotive force mentioned below must be temporarily removed, or the operator must stand on a well insulated platform, for his safety.

While I prefer usually to follow the method just described, in which a separately introduced combustible gas is employed to form matter for combustion flame, and coke employed for renewable wearing surface-of-contact between said gas and the balance of the electric circuit, yet my invention includes as one of its equivalent methods of application the employment of lumps of bituminous coal or the like, in lieu of the coke and the said combustible gas. This method is equivalent for the reason that the bituminous coal when so used will distill and form simultaneously and continuously both coke and the combustible gas, and will form both in those zones of blowpipe 14 and nozzle 11 where desired.

The apparatus being in steady operation as above described, a circuit of suitably high electromotive force from an external source is now completed by way of nozzle-electrode 11 and the flame therefrom which plays into the space-of-action 12. When the process and apparatus are used in a furnace, the circuit from one nozzle-electrode may be completed by way of its flame to the flame from one or more other similar nozzle-electrodes and through said other flames to said other nozzle-electrodes. For example there may be a total of three such electrodes and three flames, giving a three-phase connection, as shown in Fig. 3 and Fig. 4. When the process and apparatus are used in heating, cutting, welding or burning metal, only one nozzle-electrode and its accessories need be used; and the electric circuit may be closed by way of the said metal. When the process and apparatus are employed in utilizing the special properties of the arc, such as in producing or detecting waves in the ether for radiodynamic purposes, producing, detecting or amplifying sound in the air or telephonic electric current variations in a circuit, light and heat radiation, and all other uses of intensified arcs, two or more nozzle-electrodes may be used to form respectively single-phase or polyphase circuits according to the requirements of the application.

When electric currents flow through the matter of the flames as described, the properties of electric arcs are intensified. This is especially true of the heating action of said arcs—additionally to the heat of combustion of the flame—and of the heat-transmitting properties of the combined arc and combustion flame. A greater amount of electric energy can be poured into such a combustion-flame arc; and the resistance between electrodes and arcs is reduced in my process and apparatus by the high heating of the large surfaces of coke within the electrode-nozzle, with the result that the $I^2R$ heat in the circuit is generated less at the electrodes and more in the flame, where desired.

In order to regulate the input of electric energy to the flames in my new process and apparatus, we may vary the electromotive force impressed on the nozzle-electrodes; whereby the quotient $E^2/R$, which equals the electric energy converted into heat, will be changed. Or we may conveniently vary the divisor of this formula, by varying the input of gases to the flames.

The consumption of the wearing portion of the electrodes in my apparatus, i. e., of the coke, is relatively slow, for the reason that the burning mixed gas passing through the electrode-nozzle and the coke-mass is a reducing gas; there being a deficit of oxidizing gas in the mixture, as stated hereinbefore.

When my new process and apparatus are used in a furnace, any proportion of the heating thereof may be done by the burning of the combustible portion of the matter inducted through the nozzle-electrodes, and by the burning of any other fuel supplied to the furnace; the balance of the heat being supplied by the conversion of electric energy thereinto in the space-of-action affected by the operation of my new process and improved apparatus.

It is obvious that those skilled in the art may vary the steps of the process, as well as the arrangement of parts constituting the apparatus, without departing from the spirit of my invention; and they may apply my new process and apparatus to purposes additional to those specified. Therefore, I do not wish to be limited to the above disclosure except as may be required by the claims. It will be seen also that in the operation of my new process, it is necessary to use improved apparatus similar to what I have described above, and that in properly employing my improved apparatus it is necessary to operate by a process similar to the foregoing new method. For this reason, I have described the process and the apparatus together as one invention; and I now claim:

1. The process of converting electric energy into radiant energy, which consists in inducting streams of matter through holes in electrodes, burning said matter by combustion in said electrodes and in said streams and impressing suitable electromotive forces on said electrodes to cause electric conduction in said streams.

2. The process of converting electric energy into heat, which consists in inducting streams of matter through holes in electrodes, burning said matter by combustion in said electrodes and in said streams and impressing suitable electromotive forces on said electrodes to cause electric conduction in said streams.

3. The process of supplying hot blast to a furnace which consists in converting electric energy into heat by inducting streams of matter into said furnace through holes in electrodes and impressing suitable electromotive forces on said electrodes, and burning said matter by combustion in said electrodes and in said streams.

4. The process of heating a furnace which consists in converting electric energy into heat by inducting streams of matter into said furnace through holes in electrodes and impressing suitable electromotive forces on said electrodes, and in generating further heat by partially oxidizing said matter when being inducted and further oxidizing said matter after being inducted into the furnace.

5. The process of heating a furnace which consists in inducting matter into said furnace through holes in electrodes thereof, impressing suitable electromotive forces on said electrodes, and partly but not completely burning said matter while passing through said electrodes, and further oxidizing said matter after being inducted into the furnace.

6. The process of directably applying electric energy which consists in inducting streams of matter through holes in electrodes, directing said streams into the desired space of action of said energy, burning said matter by combustion in said electrodes and in said streams, impressing suitable electromotive forces on said electrodes, and causing said streams of matter to become conductors of electric current in said space.

7. The process of supplying electric energy to a furnace which consists in inducting matter into said furnace through holes in electrodes thereof, impressing suitable electromotive forces on said electrodes, and partly but not completely burning said matter while passing through said electrodes; said matter being a mixture of combustible substance with an oxidizing gas; said oxidizing gas being not sufficient in proportion to burn said combustible substance completely.

8. The process of supplying electric energy to a furnace which consists in inducting matter into said furnace through holes in electrodes thereof, impressing suitable electromotive forces on said electrodes, and partly but not completely burning said matter while passing through said electrodes; said electrodes being of dimensions not great enough to give room for the full length of flame of said partial combustion.

9. In smelting, the process of supplying to a furnace heat additional to that generated therein by chemical methods, which consists in using tuyères, through which streams of fluid matter are admitted to the furnace, as the electrodes from which gaseous electric conduction into the furnace takes place, by burning said matter by combustion in said electrodes and in said streams and by applying suitable magnitudes of electromotive force to said electrodes.

10. The process of reducing the consumption of the electrodes in electric arc furnaces which consists in inducting streams of matter into the furnace through holes in said electrodes, burning said matter by combustion in said electrodes and in said streams and forming of a portion of the flame matter of the arcs from said inducted matter.

11. The process of utilizing cheap materials in electrodes which consists in inducting through said electrodes, in holes therethrough containing bodies of electrically conducting, thermally refractory solids, streams of fluid matter; burning said matter in said electrodes and in said streams; and impressing suitable electromotive forces on said electrodes to cause electric conduction in said streams.

12. The process of utilizing cheap materials in electrodes which consists in inducting through said electrodes, in holes therethrough containing bodies capable upon heating of becoming carbonized to electrically conducting, thermally refractory solids, streams of fluid matter; burning said matter in said electrodes and in said streams; and impressing suitable electromotive forces on said electrodes to cause electric conduction in said streams.

13. The process of controllably converting electric energy into radiant energy, which consists in inducting streams of matter through holes in electrodes, burning said matter by combustion in said electrodes and in said streams and impressing suitable electromotive forces on said electrodes to cause electric conduction in said streams, and in regulating the input of electric energy to said streams by varying the magnitude of said electromotive forces.

14. The process of controllably converting electric energy into heat, which consists in inducting streams of matter through holes in electrodes, burning said matter by combustion in said electrodes and in said streams and impressing suitable electromotive forces on said electrodes to cause electric conduction in said streams, and in regulating the input of electric energy to said streams by varying the magnitude of said electromotive forces.

15. The process of controllably converting electric energy into radiant energy, which consists in inducting streams of matter through holes in electrodes, burning said matter by combustion in said electrodes and in said streams and impressing suitable electromotive forces on said electrodes to cause electric conduction in said streams, and in regulating the input of electric energy to said streams by varying in the same direction the rate of supply of said matter inducted through said holes.

16. The process of controllably converting electric energy into heat, which consists in inducting streams of matter through holes in electrodes, burning said matter by combustion in said electrodes and in said streams and impressing suitable electromotive forces on said electrodes to cause electric conduction in said streams, and in regulating the input of electric energy to said streams by varying in the same direction the rate of supply of said matter inducted through said holes.

17. In apparatus for converting electric energy into radiant energy, the combination with electrodes having longitudinal holes terminating in the arcing ends of said electrodes, of gas-induction tubes connected with said holes at the other ends; means for supplying electricity of suitable electromotive force to said electrodes; means for supplying fluid matter relatively under pressure, to said induction tubes; and means for burning said matter by combustion while and after passing through said holes.

18. In apparatus for converting electric energy into heat, the combination with electrodes having longitudinal holes terminating in the arcing ends of said electrodes, of gas-induction tubes connected with said holes at the other ends; means for supplying electricity of suitable electromotive force to said electrodes; means for supplying fluid matter relatively under pressure, to said induction tubes; and means for burning said matter by combustion while and after passing through said holes.

19. In apparatus for heating a furnace, the combination with electrodes having longitudinal holes terminating in the arcing ends of said electrodes, of gas-induction tubes connected with said holes at the other ends; means for supplying electricity of suitable electromotive force to said electrodes; means for supplying fluid matter relatively under pressure, to said induction tubes, said fluid matter being partly combustible matter and partly oxidizing gas; means for burning said matter by combustion while and after passing through said holes; and means for regulating the flow of both kinds of said fluid matter.

20. In apparatus for supplying electric energy to a furnace, the combination with electrically conducting nozzles arranged to feed fluid matter into said furnace, of induction tubes connected to said nozzles; means for continuously inducting fluid matter through said nozzles by way of said induction tubes; bodies of solid, electrically conducting, thermally refractory material in the bores of and in electric connection with said nozzles and said induction tubes; means for so regulating said inducted fluid matter that it will partly burn while in contact with said solid bodies in said bores; and means for supplying electricity to said nozzles at electromotive force suitable to cause electric conduction from said solid bodies and nozzles into said fluid matter.

21. In apparatus for supplying electric energy to a space of action, the combination with electrically conducting nozzles, of means for producing combustion flame in and from said nozzles; and means for supplying electricity of suitable electromotive force to said nozzles.

22. In apparatus for controllably supplying electric energy to a space of action, the combination with electrically conducting nozzles, of means for supplying fluid matter through the holes of said nozzles; means for burning said matter by combustion while and after passing through said holes; means for supplying electricity to said nozzles; and means for varying the electromotive force of said electricity at will.

23. In apparatus for controllably supplying electric energy to a space of action, the combination with electrically conducting nozzles, of means for producing combustion flame in and from said nozzles; means for supplying electricity of suitable electromotive force to said nozzles; and means for varying the volume and intensity of said combustion flame at will.

24. In electrode apparatus adapted to be conveniently installed in and removed from a furnace at will, the combination with nozzles resembling and spatially interchangeable with furnace tuyères, and made of electrically conducting material; of means for producing combustion flame in and from said nozzles; and means for supplying electricity of suitable electromotive force to said nozzles.

25. In electric arc apparatus adapted to consume electrode material relatively slowly, the combination with electrodes having longitudinal holes, of means for inducting matter through said holes; and means for forming a portion of the flame matter of the arcs from said inducted matter by burning said matter by combustion while and after passing through said holes and impressing on said electrodes electromotive force of magnitude suitable to cause electric conduction in said inducted matter.

26. In electric arc apparatus adapted to consume electrode material relatively slowly, the combination with electrodes having longitudinal holes, of means for inducting combustible matter through said holes; means for burning said inducted matter in and through said electrodes; and means for forming from said inducted matter a portion of the flame matter of the arcs by impressing on said electrodes electromotive force of magnitude suitable to cause electric conduction in said inducted matter.

27. In electric arc apparatus adapted to consume electrode material relatively slowly, the combination with electrodes having longitudinal holes, of means for producing in and inducting through said holes fluid combustible matter; means for burning said inducted matter in and through said electrodes; and means for forming from said inducted matter a portion of the flame matter of the arcs by impressing on said electrodes electromotive force of magnitude suitable to cause electric conduction in said inducted matter.

28. In apparatus for intensifying the properties of electric arcs, the combination with electrodes having longitudinal holes, of means for producing in and inducting through said holes fluid combustible matter; means for burning said inducted matter in and through said electrodes; and means for forming from said inducted matter a portion of the flame matter of the arcs by impressing on said electrodes electromotive force of magnitude suitable to cause electric conduction in said inducted matter.

29. In apparatus for supplying hot blast to a furnace, the combination with electrically conducting nozzles suitably disposed therein, of means for producing combustion flame in and from said nozzles, and means for supplying electricity of suitable electromotive force to said nozzles.

30. In apparatus for directably applying electric energy, the combination with electrically conducting nozzles suitably disposed to direct their discharges into a desired space of action of said energy, of means for producing combustion flame in and from said nozzles, and means for supplying electricity of suitable electromotive force to said nozzles.

31. In electric arc apparatus adapted to consume relatively cheap electrode materials, the combination with electrodes having longitudinal holes, of bodies of electrically conducting, thermally refractory solids in said holes; means for inducting fluid matter through said holes; means for burning said matter by combustion while and after passing through said holes; and means for impressing on said electrodes electromotive force of magnitude suitable to cause electric conduction in said inducted matter.

32. In electric arc apparatus adapted to consume relatively cheap electrode materials, the combination with electrodes having longitudinal holes, of bodies capable upon heating of becoming carbonized to electrically conducting, thermally refractory solids, in said holes; means for inducting fluid matter through said holes; means for burning said matter by combustion while and after passing through said holes; and means for impressing on said electrodes electromotive force of magnitude suitable to cause electric conduction in said inducted matter.

In testimony whereof I affix my signature.

GEORGE T. SOUTHGATE.